US012652506B2

(12) United States Patent
Zhang et al.

(10) Patent No.: US 12,652,506 B2
(45) Date of Patent: Jun. 9, 2026

(54) MANAGING EARPIECES FOR PRESENTING AN AUDIO STREAM

(71) Applicant: QUALCOMM Incorporated, San Diego, CA (US)

(72) Inventors: Nan Zhang, Beijing (CN); Yongjun Xu, Beijing (CN); Weipeng Fu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 18/294,133

(22) PCT Filed: Oct. 28, 2021

(86) PCT No.: PCT/CN2021/126888

§ 371 (c)(1),
(2) Date: Jan. 31, 2024

(87) PCT Pub. No.: WO2023/070413

PCT Pub. Date: May 4, 2023

(65) Prior Publication Data

US 2024/0381044 A1 Nov. 14, 2024

(51) Int. Cl.
*H04R 29/00* (2006.01)
*H04R 1/1025* (2026.01)

(52) U.S. Cl.
CPC ......... *H04R 29/002* (2013.01); *H04R 1/1025* (2013.01); *H04R 2420/01* (2013.01); *H04R 2420/07* (2013.01); *H04R 2460/03* (2013.01)

(58) Field of Classification Search
CPC .............. H04R 2420/07; H04R 1/1025; H04R 1/1041; H04R 2420/01; H04R 2420/05;
(Continued)

(56) References Cited

U.S. PATENT DOCUMENTS 8,155,335 B2 4/2012 Rutschman
2009/0074216 A1 3/2009 Bradford et al.
(Continued)

FOREIGN PATENT DOCUMENTS

CN 108958696 A 12/2018
EP 3896992 A1 10/2021
(Continued)

OTHER PUBLICATIONS

International Search Report and Written Opinion—PCT/CN2021/126888—ISA/EPO—Mar. 10, 2022. 9 pages.
(Continued)

*Primary Examiner* — Lun-See Lao
(74) *Attorney, Agent, or Firm* — Muncy, Geissler, Olds & Lowe, P.C.

(57) ABSTRACT

Various embodiments provide systems and methods for managing a first earpiece and a second earpiece for presenting an audio stream from a wireless device. Various embodiments may include monitoring a battery level of the first earpiece and a battery level of the second earpiece, determining whether the battery level of the first earpiece meets a threshold, and configuring the wireless device to send a monophonic audio stream to the second earpiece in response to determining that the battery level of the first earpiece meets the threshold.

28 Claims, 8 Drawing Sheets

(58) Field of Classification Search

CPC .............. H04R 2460/03; H04R 25/305; H04R 25/554; H04R 29/002; H04R 3/00; H04R 3/04; H04R 5/04; G06F 3/162; G06F 3/165; H04S 7/307; H04S 7/308

USPC ........................................... 381/1–3, 74, 312

See application file for complete search history.

(56) References Cited

U.S. PATENT DOCUMENTS

| | | | | |
|---|---|---|---|---|
| 2017/0164089 | A1* | 6/2017 | Lee ...................... | H04R 1/1025 |
| 2017/0264987 | A1* | 9/2017 | Hong ................... | H04R 1/1091 |
| 2018/0103321 | A1 | 4/2018 | Seo et al. | |
| 2018/0276039 | A1* | 9/2018 | Boesen ................ | H04R 1/1041 |
| 2018/0338197 | A1 | 11/2018 | Jeong et al. | |
| 2019/0200113 | A1 | 6/2019 | Kim et al. | |

FOREIGN PATENT DOCUMENTS

| | | | |
|---|---|---|---|
| JP | 2012070301 | A | 4/2012 |
| JP | 2020108150 | A | 7/2020 |
| WO | WO-2008113053 | A1 | 9/2008 |
| WO | WO-2020050134 | A1 | 3/2020 |
| WO | WO-2022224467 | A1 | 10/2022 |

OTHER PUBLICATIONS

Supplementary European Search Report—EP219617818—Search Authority—Munich—Jun. 11, 2025.

* cited by examiner

MANAGING EARPIECES FOR PRESENTING AN AUDIO STREAM

BACKGROUND

Wireless devices such as wireless headphones, wireless earphones, earbuds, and the like are often used with an audio source such as media players, cellular telephones, computers, and other electronic devices. Such wireless devices have become increasingly compact and sophisticated. Some wireless devices may include two earpieces that each include a small rechargeable battery and a processor. Managing such wireless devices may pose challenges. Often, a battery level of one earpiece differs from the a battery level of the other earpiece. For example, a user may use one earpiece more frequently than the other earpiece. As another example, due to subtle differences in manufacture, circuitry, signal processing, sound reproduction, and the like, the battery of one earpiece may be drained more rapidly than the battery of the other earpiece. In many cases, the remaining battery life of the wireless device may be determined based on the lower remaining battery level of the two earpieces. Consequently, the useable duration of the wireless device may be limited by the earpiece with the faster-draining or lower battery level.

SUMMARY

Various embodiments include systems, methods, and devices configured to manage transmission of an audio stream from an audio source to a wireless device including a first earpiece and a second earpiece.

Various aspects may include monitoring a battery level of a first earpiece and a battery level of the second earpiece, determining whether the battery level of the first earpiece meets a threshold, and configuring a wireless device to send a monophonic audio stream to the second earpiece in response to determining that the battery level of the first earpiece meets the threshold. Various aspects may further include receiving the monophonic audio stream by the second earpiece in aspects in which the processor is within one of the first or second earpieces. Various aspects may further include sending the monophonic audio stream from the wireless device to the second earpiece. Some aspects may further include placing the first earpiece in a low power mode.

Some aspects may further include presenting a notification that the wireless device will send or is sending the monophonic audio stream to the second earpiece. Some aspects may further include presenting a notification that the wireless device will send the monophonic audio stream to the wireless device via a user interface configured to receive an acceptance input or an override input, and leaving the wireless device in a configuration to send audio streams to the first and second earpieces in response to receiving the override input on the user interface, in which configuring the wireless device to send a monophonic audio stream to the second earpiece is performed in response to determining that the battery level of the first earpiece meets the threshold and receiving the acceptance input on the user interface. Some aspects may further include presenting a notification that the wireless device will send the monophonic audio stream to the wireless device via a user interface configured to receive an acceptance input or an override input, in which configuring the wireless device to send a monophonic audio stream to the second earpiece is performed in response to determining that the battery level of the first earpiece meets the threshold and a passage of a predetermined amount of time following displaying the notification without receiving a user input on the user interface.

Some aspects may further include determining whether a difference between the battery level of the first earpiece and the battery level of the second earpiece meets a threshold difference, and presenting a notification to move the wireless device closer to the first earpiece or the second earpiece having a lower battery level in response to determining that the difference between the battery level of the first earpiece and the battery level of the second earpiece meets the threshold difference.

In some aspects, determining whether the battery level of the first earpiece meets a threshold may include determining whether a difference between the battery level of the first earpiece and the battery level of the second earpiece meets a threshold difference, and configuring the wireless device to send a monophonic audio stream to the second earpiece in response to determining that the battery level of the first earpiece meets the threshold may include configuring the wireless device to send a monophonic audio stream to the second earpiece in response to determining that the difference between the battery level of the first earpiece and the battery level of the second earpiece meets the threshold difference.

In some aspects, configuring the wireless device to send a monophonic audio stream to the second earpiece may include mixing a first audio stream channel and a second audio stream channel to form the monophonic audio stream. In some aspects, configuring the wireless device to send a monophonic audio stream to the second earpiece may include mixing a first signal from a first signal source and a second signal from a second signal source to form the monophonic audio stream.

Further aspects include a computing device including a processor configured with processor-executable instructions to perform operations of any of the methods summarized above. Further aspects include a non-transitory processor-readable storage medium having stored thereon processor-executable software instructions configured to cause a processor to perform operations of any of the methods summarized above. Further aspects include a processing device for use in the computing device and configured to perform operations of any of the methods summarized above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
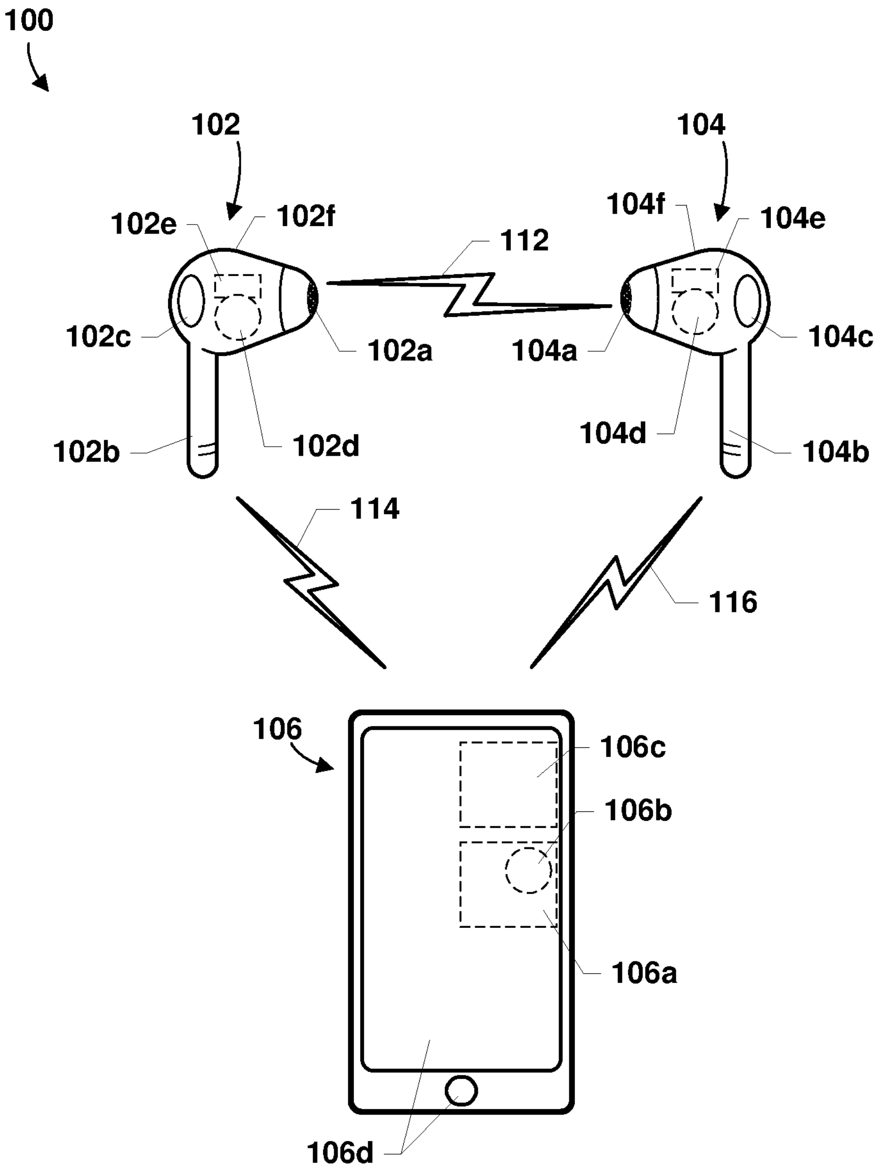
FIG. 1 is a component block diagram illustrating an example composite electronic device suitable for use with the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments provide methods executed by a processor of an electronic device for managing a pair of earpieces for presenting (playing) an audio stream from a wireless device. Various embodiments may include a processor of an earpiece or a wireless device monitoring a battery level of the first earpiece and a battery level of the second earpiece, and determining whether the battery level of one of the earpieces meets a threshold battery level. In response to determining that the battery level of one of the earpieces meets the threshold, the processor may configure an audio source to send a monophonic audio stream to the other earpiece. In some embodiments, the processor may place the earpiece with the battery level that meets the threshold into a low-power state.

The term "wireless device" is used herein to refer to any one or all of wireless portable computing devices, smartphones, cellular telephones, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless router devices, appliances for home or enterprise use, wireless communication elements within vehicles, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "component," "system," "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Wireless devices referred to as "headphones," "earphones," "earbuds," and the like may include two wireless earpieces that each include a small rechargeable battery, a processor, a transceiver (e.g., a Bluetooth transceiver), and at least one small speaker. In some implementations, the earpieces are physically independent devices that may communicate with each other and with another wireless device (such as an audio source) by wireless communication. Such wireless communications may utilize signals according to a wireless communication protocol such as Bluetooth or another suitable protocol. Over time the battery level of one earpiece may become different than the battery level of the other earpiece. For example, a user may use one earpiece more frequently than the other earpiece. As another example, due to subtle differences in manufacture, circuitry, signal processing, sound reproduction, and the like, the battery of one earpiece may be consumed more rapidly than the battery of the other earpiece. Conventionally, a remaining usable time of the two earpieces together may be determined based on the lower remaining battery level of the two earpieces. For example, if a left earpiece has a battery level of 82% and a right earpiece has a battery level of 60%, the remaining battery level of both the left and right earpiece may be determined to be 60%. Consequently, the useable duration of both earpieces may be limited by the earpiece with the faster-draining or lower battery level.

Various embodiments provide methods executed by a processor of an electronic device and/or an earpiece for managing a first earpiece and a second earpiece for presenting an audio stream transmitted to the earpieces by a wireless device. In some embodiments, the methods may be performed by a processor of an earpiece, such as a processor of the first earpiece or of the second earpiece. In some embodiments, the methods may be performed by processor of a wireless device functioning as an audio source device (e.g., a smartphone). In some embodiments, the methods may be performed by any combination of such processors.

In some embodiments, a processor (e.g., of an earpiece, of a wireless device, etc.) may monitor a battery level of the first earpiece and a battery level of the second earpiece. In some embodiments, the processor may determine whether the battery level of the first earpiece meets a threshold. In some embodiments, in response to determining that the battery level of the first earpiece meets the threshold, the processor may configure the wireless device to send a monophonic audio stream to the second earpiece. In embodiments in which the processor is in an earpiece (either the first or second earpiece), the processor may communicate with the wireless device to cause the wireless device to send a monophonic audio stream to the second earpiece. Subsequently, the wireless device may send the monophonic audio stream to the second earpiece. In some embodiments, the processor may place the first earpiece in a low power mode (e.g., a sleep mode, an idle mode, and the like).

In various embodiments, the processor may monitor the battery level of the first earpiece and/or the second earpiece regardless of whether the wireless device is sending an audio stream to the first and/or second earpieces. In such embodiments, configuring the wireless device to send a monophonic audio stream to the second earpiece may include setting an indication in memory (such as a flag or another suitable indicator) to send the monophonic audio stream the next time the wireless device sends an audio stream. In some embodiments, configuring the wireless device to send a monophonic audio stream to the second earpiece may include configuring the wireless device to change from sending an audio stream to the first and second earpieces to sending the monophonic audio stream to the second earpiece.

In some embodiments, a notification may be presented that the wireless device will send or is sending the monophonic audio stream to the second earpiece. In various embodiments, such a notification may be visual, audible, tactile, and/or any other suitable notification. In some embodiments, the notification may be presented by one or more of the first earpiece and/or the second earpiece via an audible notification. In some embodiments, the notification may be presented by the wireless device on a display, such as a touch-sensitive display. In some embodiments, responsive to the notification, the wireless device may receive a user override input via a user interface device, such as a button, a switch, a touch screen display, and/or the like. In response to receiving the user override input, the processor may leave the wireless device in a configuration to send audio streams to the first and second earpieces. In some embodiments, the processor may configure the audio source to send the monophonic audio stream to the second earpiece in response to determining that the battery level of the first earpiece meets the threshold and receiving either a user acceptance input on the user interface.

In some embodiments, the wireless device may initialize a timer (which may, in various embodiments, count up or count down) upon presenting the notification that the wireless device will send or is sending the monophonic audio stream to the second earpiece. In some embodiments, the processor may configure the audio source to send the monophonic audio stream to the second earpiece in response to determining that the battery level of the first earpiece meets the threshold and passage of a predetermined amount of time following displaying the notification without receiving a user input on the wireless device's user interface (e.g., expiration or completion of the timer).

In some embodiments, the processor may determine that a difference between the battery level of the first earpiece and a battery level of the second earpiece meets a threshold (e.g., a battery level delta or a battery level difference threshold). In some embodiments, in response to determining that the difference between the battery level of the first earpiece and the battery level of the second earpiece meets the threshold, the processor may configure the wireless device to send the monophonic audio stream to the second earpiece. In some embodiments, the processor may configure the wireless device to send the monophonic audio stream to the second earpiece in response to determining both that the battery level of the first earpiece meets a threshold and that the difference between the battery level of the first earpiece and the battery level of the second earpiece meets the difference threshold. In some embodiments, in response to determining that the difference between the battery level of the first earpiece and the battery level of the second earpiece meets the difference threshold, the processor may present a notification or suggestion to move the wireless device closer to the first earpiece or the second earpiece having a lower battery level.

In some embodiments, the processor may mix a first audio stream channel and a second audio stream channel to form the monophonic audio stream. For example, the processor may mix a left channel and a right channel from a stereo audio stream to form the monophonic audio stream. In some embodiments, the processor may mix the one or more aspects of left channel and the right channel in less than equal amounts to form the monophonic audio stream. In some embodiments, the processor may mix a first signal from a first signal source and a second signal from a second signal source to form the monophonic audio stream. For example, the processor may mix a first audio signal from a first application and a second audio signal from a second application to form the monophonic audio stream.

As noted above, in some embodiments, the processor may place the first earpiece in a low power mode. In such embodiments, using the second earpiece may reduce its battery level closer to the battery level of the first earpiece. In some embodiments, the processor may determine whether the battery level of the second earpiece substantially matches the battery level of the first earpiece. In some embodiments, the processor may determine whether the battery level of the second earpiece and the battery level of the first earpiece meet (or are within) a threshold battery level difference. In some embodiments, in response to determining that the battery level of the second earpiece and the battery level of the first earpiece meet the threshold battery level difference (or that the battery level of the second earpiece substantially matches the battery level of the first earpiece), the processor may configure the wireless device to send an audio stream to the first earpiece and the second earpiece. In some embodiments, in response to determining that the battery level of the second earpiece and the battery level of the first earpiece meet the threshold battery level difference (or that the battery level of the second earpiece substantially matches the battery level of the first earpiece), the processor may present a low battery level warning for both the first earpiece and the second earpiece.

Various embodiments are described herein using Bluetooth and Bluetooth-related terminology as a convenient example of a communications technology for wirelessly connecting electronic devices located within a relatively short distance of one another (e.g., 100 meters). However, examples using references to Bluetooth are for illustration purposes only and are not intended to limit the descriptions or the claims to that particular standard. For example, various embodiments may be implemented using other wireless communication protocols such as Wi-Fi, Zigbee, Thread, Z-Wave, or another similar wireless communication protocol.

FIG. 1 is a component block diagram illustrating an example composite electronic device 100 suitable for use with the various embodiments. The composite electronic device 100 may include a left earpiece 102, a right earpiece 104, and an audio source such as a wireless device 106. Each component 102, 104, 106 may be individually paired to each of the other components via wireless communication links 112, 114, 116.

Each earpiece 102, 104 may include a speaker 102*a*, 104*a* for generating sounds based on audio signals received from the wireless device 106 or the other earpiece 102, 104 (e.g., relaying a signal from the wireless device 106). Each earpiece 102, 104 may include radio frequency (RF) components 102*b*, 104*b*, which may include circuitry and an antenna for receiving and/or transmitting RF signals, such as Bluetooth protocol signals. Each earpiece 102, 104 also may include one or more user interface (UI) elements 102*c*, 104*d* configured to receive an input that may control one or more operations of the earpiece(s) 102, 104, such as a button, a switch, a capacitive switch, and/or another suitable device configured to receive an input. Each earpiece 102, 104 also may a processor 102*d*, 104*d* to control operations of the earpiece 102, 104, and a battery 102*e*, 104*e* to store and provide power for the operations of each earpiece 102, 104. Further, each earpiece 102, 104 may include a housing 102*f*, 104*f* to support the speaker 102*a*, 102*b*, the RF components 102*b*, 104*b*, the UI elements 102*c*, 104*c*, the processor 102*d*, 104*d*, and the battery 102*e*, 104*e*.

The wireless device 106 may include a processor 106*a*. The processor 106*a* may be coupled to and control operations of RF components 106*c* that enable wireless communication with the earpieces 102, 104. The processor 106*a* may receive an input via a UI element 106*d*, such as a button, switch, touchscreen device, and/or the like. The processor 106*a* also may control operations of a media player 106*b* that transmits wireless audio and/or control streams to the earpieces 102, 104. In various embodiments, the media player 106 may be implemented in hardware, software, or some combination of hardware and software. In some embodiment, the wireless device 106 may be configured to transmit an audio data stream and a control stream to each of the earpieces 102, 104. In such embodiments, the control stream may be transmitted via a separate out-of-band channel. In some embodiments, the wireless device 106 may transmit the audio and/or control streams to a first earpiece (e.g., either of 102 or 104), which may receive the wireless transmission and transmit an audio and/or control stream to the second earpiece 104, 102. In such embodiments, the first earpiece 102, 104 may operate as a master device for the second earpiece 102, 104 because it is both sending and receiving information. In some embodiments, two or more of the components 102, 104, 106 may be coupled together in an advanced audio distribution profile (A2DP) configuration. In some embodiments, two or more components 102, 104, 106 may be coupled together using a proprietary protocol that allows for communications in addition to, or independent of, the Bluetooth communications.

Figure 2:
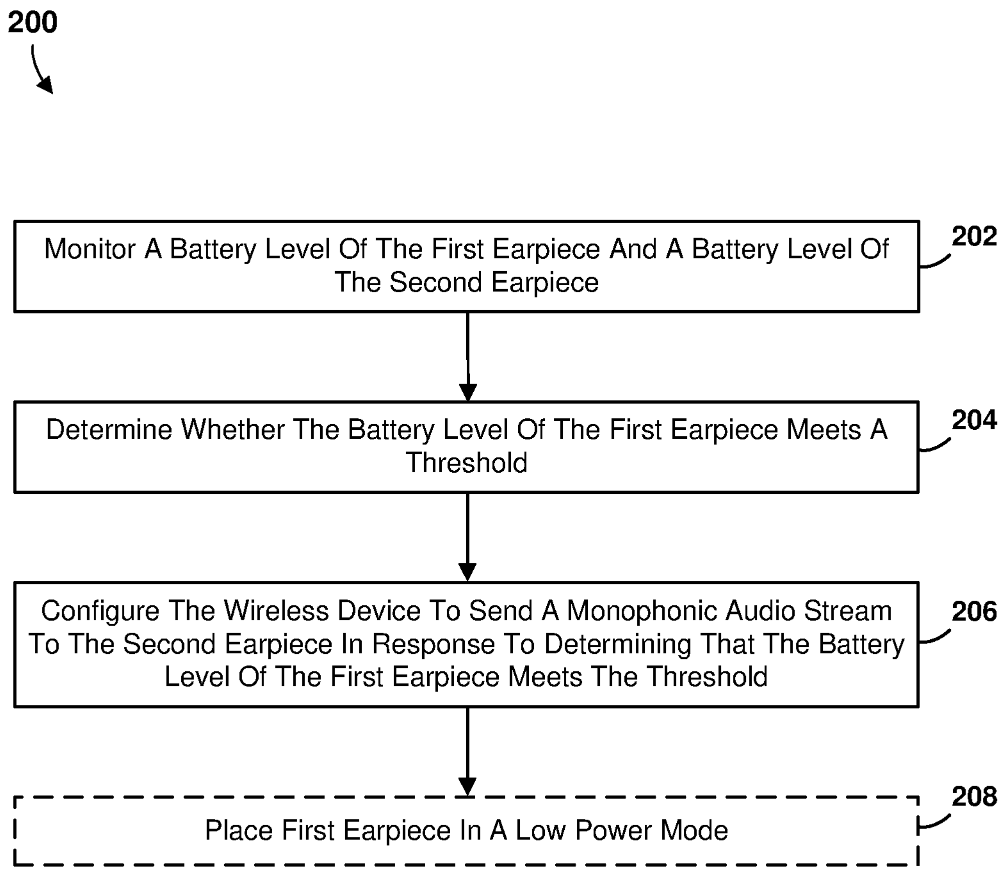
FIG. 2 is a process flow diagram illustrating a method that may be performed by a processor of an earpiece or a processor a wireless device for managing a first earpiece and a second earpiece for presenting an audio stream from the wireless device according to various embodiments.

FIG. 2 is a process flow diagram illustrating a method 200 that may be performed by a processor of an earpiece or a processor a wireless device for managing a first earpiece and a second earpiece for presenting an audio stream from the wireless device according to various embodiments. With reference to FIGS. 1 and 2, the method 200 may be implemented by a processor (e.g., 102*d*, 104*d*, 106*a*) of an earpiece (e.g., 102, 104) or a wireless device (e.g., 106).

In block 202, the processor may monitor a battery level of the first earpiece and a battery level of the second earpiece. In some embodiments, the processor may determine the battery levels of the first and second earpieces according to a polling message, control signaling from the first and/or second earpiece, or other suitable information. Means for performing the operations of block 202 may include the processor 102*d*, 104*d*, 106*a* and the RF components 102*b*, 104*b*, 106*c*.

In block 204, the processor may determine whether the battery level of the first earpiece meets a threshold. For example, the processor may determine whether the battery level of the earpiece 102 meets a threshold battery level. Means for performing the operations of block 204 may include the processor 102*d*, 104*d*, 106*a*.

In block 206, the processor may configure the wireless device to send a monophonic audio stream to the second earpiece in response to determining that the battery level of the first earpiece meets the threshold. In embodiments in which the processor is within the wireless device, the processor may configure the wireless device 106 to send a monophonic audio stream to the earpiece 104. In some embodiments, the processor may configure a media player (e.g., 106) of the wireless device to send the monophonic audio stream to the second earpiece (e.g., via the RF components 106*c*). In embodiments in which the processor is within an earpiece (e.g., 102 or 104), the processor may communicate with (e.g., send a signal to) the wireless device (e.g., 160) to indicate or instruct the processor of the wireless device to configure the wireless device (e.g., the media player) to send the monophonic audio stream to the second earpiece. Means for performing the operations of block 206 may include the processor 102*d*, 104*d*, 106*a*, the media player 106*b*, and the RF components 102*b*, 104*b*, 106*c*.

In some embodiments, the processor may mix a first audio stream channel and a second audio stream channel to form the monophonic audio stream. For example, the processor may mix a left channel and a right channel from a stereo audio stream to form the monophonic audio stream. In some embodiments, the processor may mix the one or more aspects of left channel and the right channel in less than equal amounts to form the monophonic audio stream. In some embodiments, the processor may mix a first signal from a first signal source and a second signal from a second signal source to form the monophonic audio stream. For example, the processor may mix a first audio signal from a first application and a second audio signal from a second application to form the monophonic audio stream.

In some embodiments, the processor may stream audio to both earpieces (e.g., left channel to the left earpiece and right channel to the right earpiece). In some embodiments, the processor may transmit the full stream to both earpieces, which can then play the appropriate sound). In some embodiments, the processor may send the full stream to a single earpiece, which relays the full stream to the other earpiece or just the relevant part to the other earpiece (e.g., left stream only to left earpiece). In some embodiments, either earpiece can serve as the master because they are both configured for such. In some embodiments, only one earpiece may be the master (e.g., only one earpiece is equipped for such). In such embodiments, the master earpiece's workload will be more battery intensive, so the master earpieces's battery will drain faster. Thus, in some embodiments, once the master earpiece battery reaches a threshold, the wireless device may directly send the monophonic stream to the other earpiece.

In optional block 208, the processor may place the first earpiece in a low power mode. For example, the processor may send a signal or message to place the first earpiece in (or to instruct the first earpiece to enter) a low power mode, a sleep mode, and idle mode, and/or the like. When the first earpiece is in the low power mode, the first earpiece may not receive an audio stream and/or may not present an audio output.

FIGS. 3A-3D are process flow diagrams illustrating operations 300*a*-300*c* that may be performed by a processor of an earpiece or a processor a wireless device as part of the method 200 for managing a first earpiece and a second earpiece for presenting an audio stream from the wireless device according to various embodiments. With reference to FIGS. 1-3D, the operations 300*a*-300*d* may be implemented by a processor (e.g., 102*d*, 104*d*, 106*a*) of an earpiece (e.g., 102, 104) or a wireless device (e.g., 106).

Figure 3A:
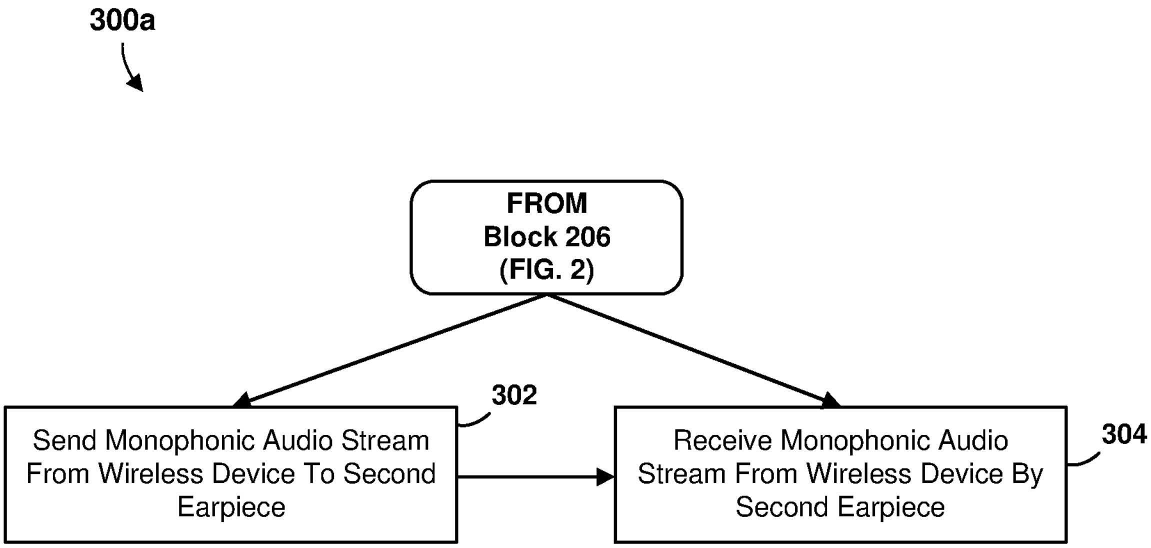
FIGS. 3A-3D are process flow diagrams illustrating operations that may be performed by a processor of an earpiece or a processor a wireless device as part of the method for managing a first earpiece and a second earpiece for presenting an audio stream from the wireless device according to various embodiments.

Referring to FIG. 3A, after configuring the wireless device to send a monophonic audio stream to the second earpiece in response to determining that the battery level of the first earpiece meets the threshold in block 206, the processor (e.g., of the wireless device 106) may send the monophonic audio stream from the wireless device to the second earpiece in block 302. Means for performing the operations of block 302 may include the processor 106*a* and the RF components 106*c*.

In block 304, the processor (e.g., of the second earpiece) may receive the monophonic audio stream from the wireless device and play the audio stream via the earpiece's speaker. Means for performing the operations of block 304 may include the processor 104*d* and the RF components 104*b*.

Figure 3B:
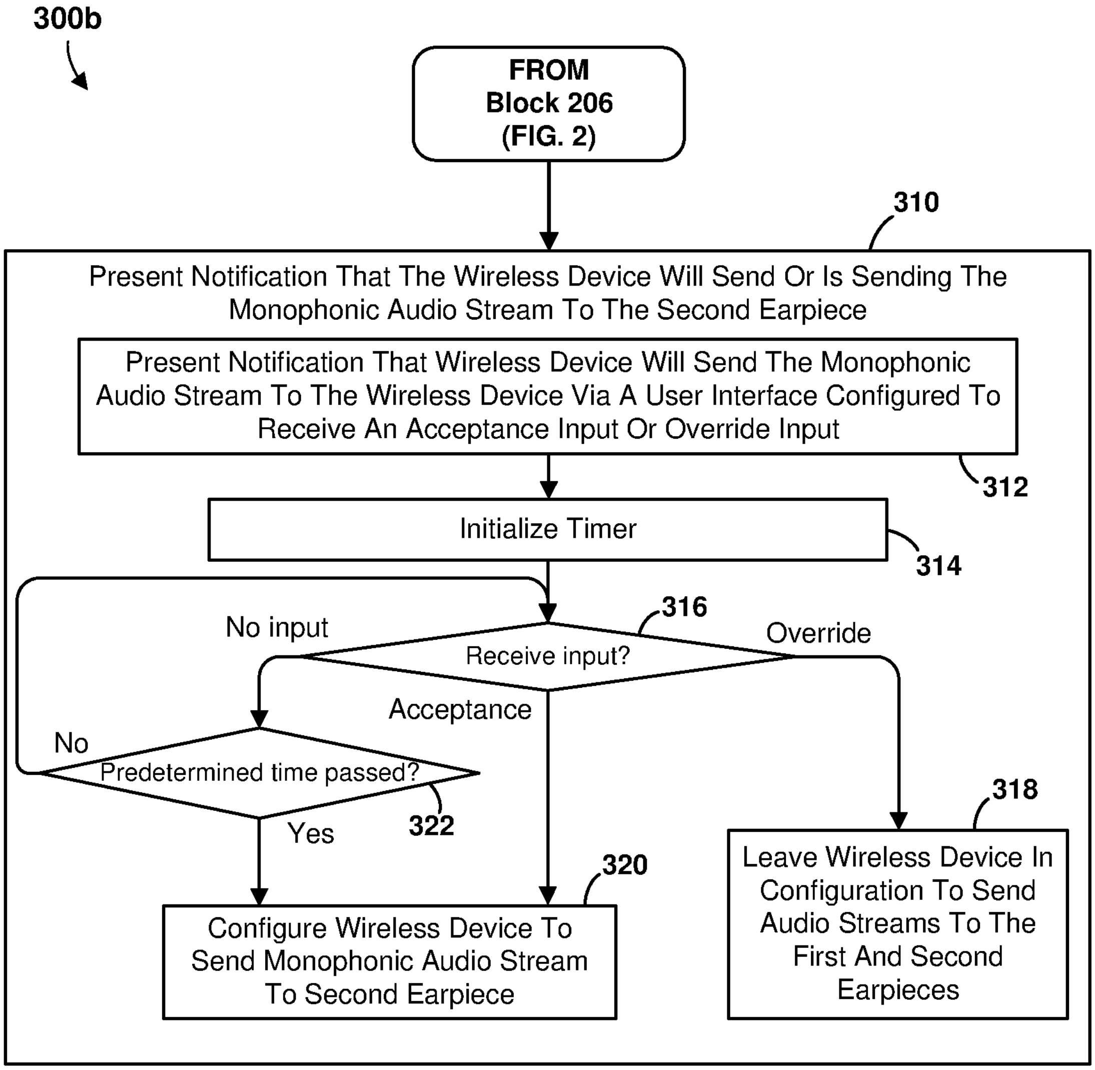

Referring to FIG. 3B, after configuring the wireless device to send a monophonic audio stream to the second earpiece in block 206, the processor (e.g., of the wireless device 106) may present a notification that the wireless device will send the monophonic audio stream to the second earpiece in block 310. In embodiments in which the processor is in an earpiece (either the first or second earpiece), the processor may render an audio notification that the wireless device will send or is sending the monophonic audio stream to the second earpiece in block 310. Means for performing the operations of block 310 may include the processor 104*d* and the UI elements 106*d*.

In some embodiments, in block 312, the processor may present the notification that the wireless device will send or is sending the monophonic audio stream to the wireless device via a user interface configured to receive an acceptance input or override input, such as a touch-sensitive display on which a graphical user interface is rendered. For example, the processor may present the notification via a touchscreen device (e.g., 106*d*). Means for performing the operations of block 312 may include the processor 104*d* and the UI elements 106*d*.

In block 314, the processor may initialize a timer upon or after presenting the notification. In some embodiments, the timer may be a countdown timer that will expire when a predetermined period of time has passed. In some embodiments, the timer may be count-up timer combined with a comparator configured to determine when the elapsed time equals a pre-determined time. This timer may be used by the processor to determine when a predetermined duration has passed since the notification was presented. Means for performing the operations of block 314 may include the processor 104*d*.

In determination block 316, the processor may determine whether a user input has been received. In particular, the processor may determine whether a button push or touchscreen touch on a graphical user interface signals a user input to accept changing the audio stream to a monophonic audio stream or override that changes (and thus continue the current audio setting). In embodiments in which the processor is in an earpiece (either the first or second earpiece), the processor may determine whether a button on the earpiece was pushed. In some embodiments, the processor may be configured to monitor user speech and recognize a user input as an audio command (e.g., "override" or "accept"). Means for performing the operations of determination block 316 may include the processor 104*d* and the UI elements 106*d*.

In response to determining that an override user input has been received (i.e., determination block 316="Override"), the processor may leave the wireless device in a current configuration sending audio streams to the first and second earpieces in block 318. Means for performing the operations of block 318 may include the processor 104*d*, the media player 106*b*, and the RF components 106*c*.

In response to determining that an acceptance input has been received (i.e., determination block 316="Acceptance"), the processor may configure the wireless device to send a monophonic audio stream to the second earpiece in block 320. Means for performing the operations of block 320 may include the processor 106*a*, the media player 106*b*, and the RF components 106*c*.

In response to determining that no input has been received (i.e., determination block 316="No input"), the processor determine whether the predetermined time has passed in determination block 322. In some embodiments, the timer may expire and notify the processor (e.g., by setting a flag or issuing an interrupt). Means for performing the operations of determination block 322 may include the processor 106*a*.

In response to determining that the predetermined time has not passed (i.e., determination block 322="No"), the processor may determine whether an input has been received in determination block 316 as described.

In response to determining that the predetermined time has passed or expiration of the timer (i.e., determination block 322="Yes"), the processor may configure the wireless device to send a monophonic audio stream to the second earpiece in block 320 as described.

Figure 3C:
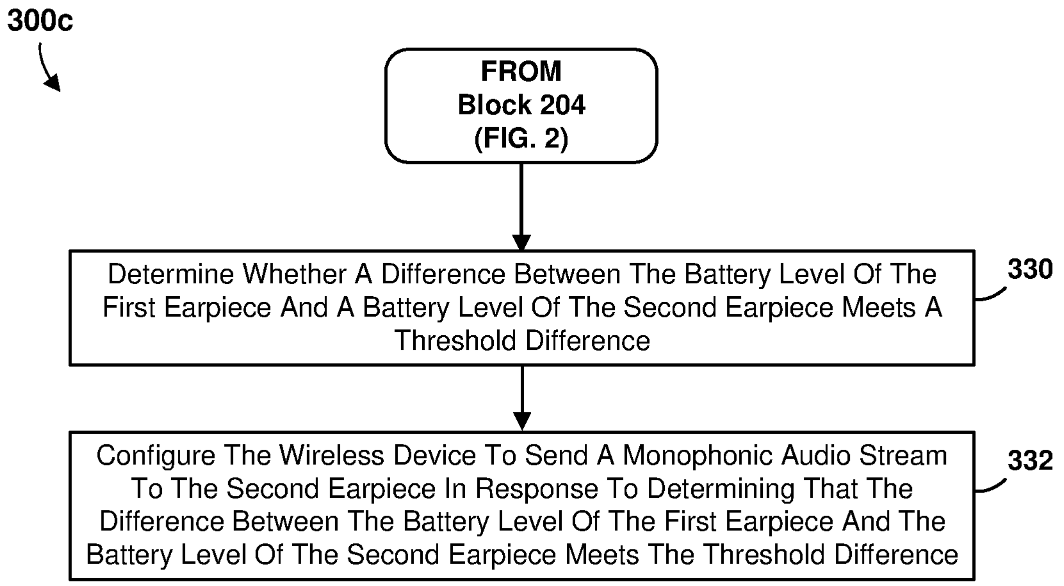

Referring to FIG. 3C, in addition to, or as an alternative to, determining whether the battery level of the first earpiece meets a threshold in block 204, the processor may determine whether a difference between the battery level of the first earpiece and the battery level of the second earpiece meets a threshold difference in block 330. Means for performing the operations of determination block 330 may include the processor 102*d*, 104*d*, 106*a*.

In block 332, the processor may configure the wireless device to send a monophonic audio stream to the second earpiece in response to determining that the difference between the battery level of the first earpiece and the battery level of the second earpiece meets the threshold. In some embodiments, the processor may configure the wireless device to send the monophonic audio stream to the second earpiece in response to determining both that the battery level of the first earpiece meets a threshold and that the difference between the battery level of the first earpiece and the battery level of the second earpiece meets the difference threshold. Means for performing the operations of block 332 may include the processor 102*d*, 104*d*, 106*a*, the media player 106*b*, and the RF components 102*b*, 104*b*, 106*c*.

Figure 3D:
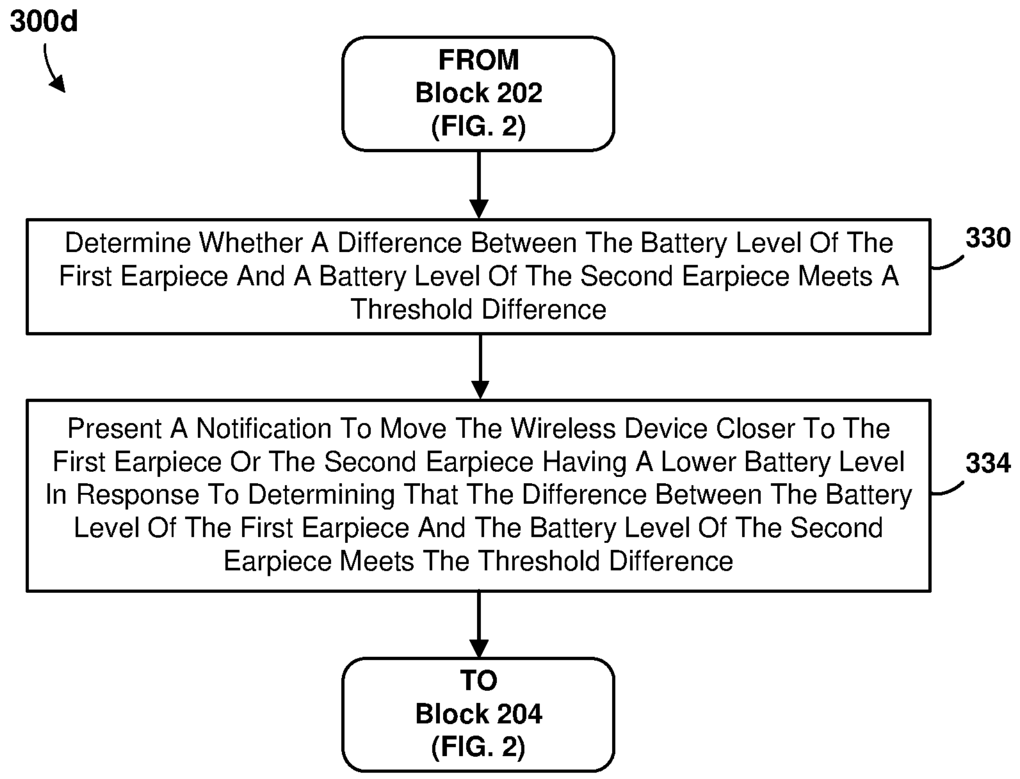

Referring to FIG. 3D, before changing the audio stream to a monophonic audio stream directed to one of the two earpieces, the processor may present a prompt or information suggesting to the user that the position of the wireless device be moved closer to an earpiece with a lower battery level in an attempt to extend the duration that the earpieces may continue to receive and render a stereophonic audio stream. In some cases, the two earpieces may exhibit uneven power demands, resulting in the battery levels of the earpieces diverging, when the wireless link (e.g., Bluetooth signals) from the wireless device to the earpieces differs significantly. When this happens, the earpiece experiencing a weaker communication link to the audio source may consume more battery power as the processor compensates, such as requiring retransmission and reprocessing of dropped packets and/or transmitting acknowledgement messages at higher power level. For example, if a user places the wireless device in a pants pocket, the earpiece on the opposite side of the body from that pocket may receive the audio stream at a receive power than the other earpiece due to the longer path length and signal absorption by the user's body. When this happens, shifting the wireless device to a position closer to the earpiece with the lower battery level, such as moving the wireless device to a different pocket, may shift the relative power drain among the two earpieces, and thus enable the earpieces to continue receiving and playing stereo audio before the battery level of one of the earpieces falls below the threshold for shifting to monophonic audio.

In this embodiment, after the battery levels of the first and second earpieces have been determined in block 202 of the method 200 as described, the processor may determine whether a difference between the battery level of the first earpiece and the battery level of the second earpiece meets a difference threshold in block 330. Means for performing the operations of determination block 330 may include the processor 102*d*, 104*d*, 106*a*.

In block 334, the processor may present a notification a notification for the user to move the wireless device closer to the first earpiece or the second earpiece having a lower battery level in response to determining that the difference between the battery level of the first earpiece and the battery level of the second earpiece meets the threshold difference. For example, the wireless device may present a message on a display (in some cases in combination with a haptic signal) explaining that the battery levels of the earpieces are diverging and suggesting moving the wireless device closer to the earpiece with the lower battery level. In embodiments in which the processor is in one (or both) of the earpieces, the processor may play an audio message suggesting that the user move the wireless device closer to the earpiece with the lower battery level. Means for performing the operations of block 206 may include the processor 102*d*, 104*d*, 106*a*.

After presenting the notification in block 334, the processor may determine whether the battery level of either the first or second earpieces meets the threshold for switching to a monophonic audio stream in block 204 of the method 200 as described. Thus, the processor may continue to monitor the battery levels of the earpieces for when one of the earpieces meets the threshold.

Figure 4:
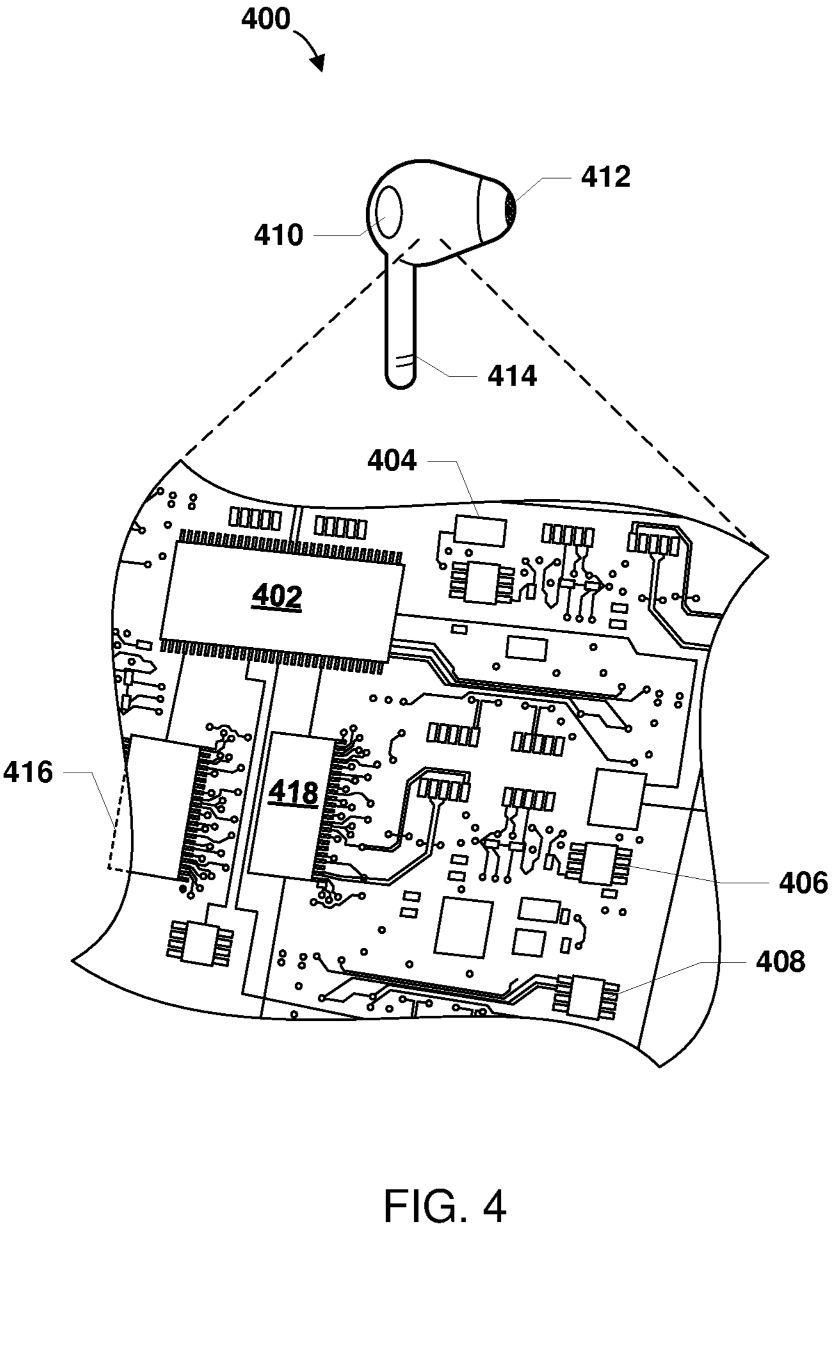
FIG. 4 is a component block diagram illustrating an example wireless earpiece suitable for use with various embodiments.

FIG. 4 is a component block diagram illustrating an example wireless earpiece 400 suitable for use with various embodiments. With reference to FIGS. 1-4, the wireless earpiece 400 may include a processor 402 coupled to volatile or non-volatile internal memories 404 and 406. The wireless earpiece 400 may include one or more radios/antennas 408 for sending and receiving electromagnetic radiation that may be connected to a wireless data link and coupled to the processor 402. The radios/antennas 408 may be used with the above-mentioned circuitry to implement a communication protocol, such as a Bluetooth protocol stack/interface.

The wireless earpiece 400 may also include a user interface 410 such as one or more physical buttons, switches, capacitive switches, etc. for receiving user inputs, a speaker 412 configured to generate an audio output, and a microphone 414 to receive audio input, all of which may be coupled to the processor 402. The wireless earpiece 400 may further include a battery 416 coupled to an inductive charging circuit, and a coil antenna 418 which may be an inductive coil adapted to enable inductive charging of the battery 416.

Figure 5:
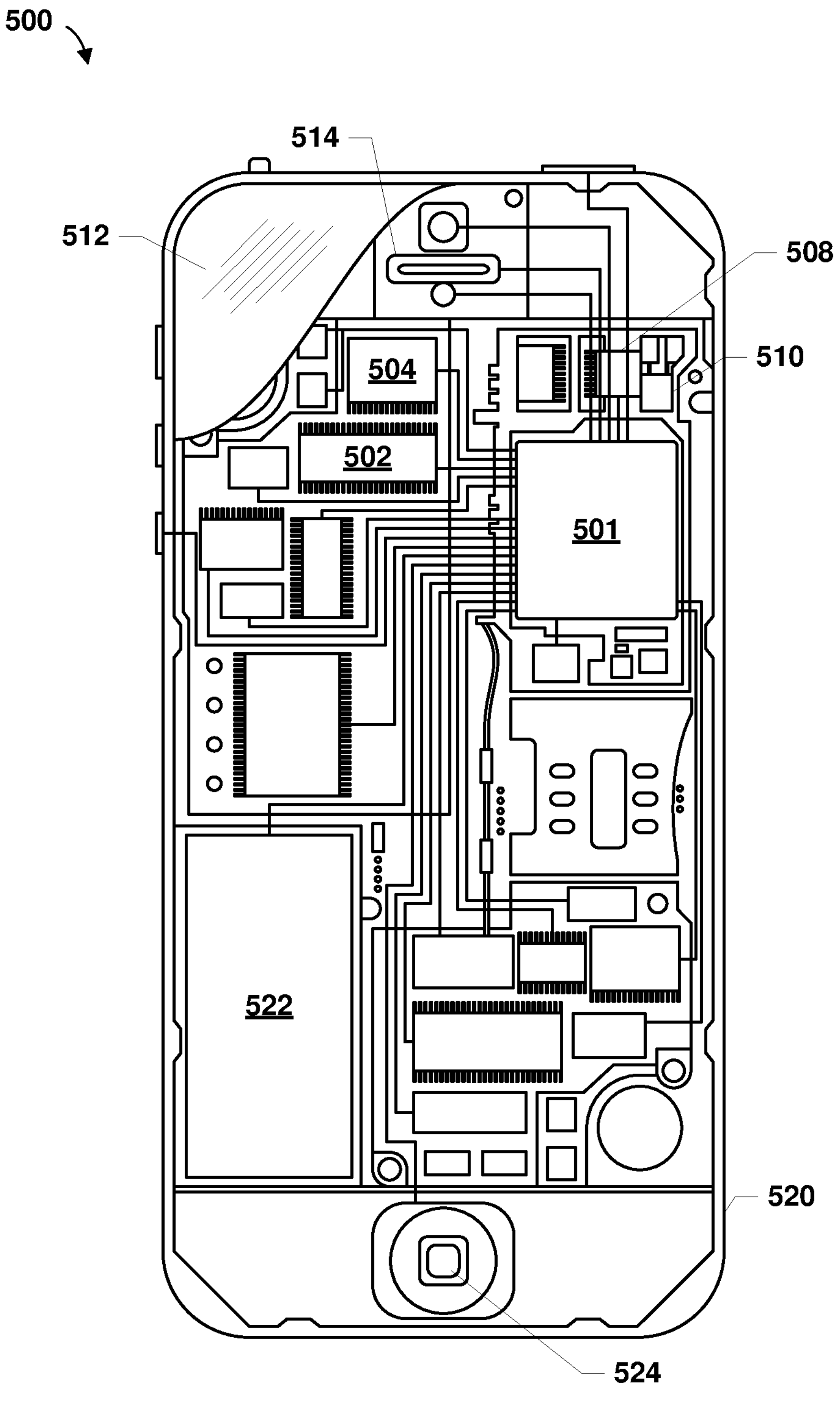
FIG. 5 is a component block diagram illustrating an example wireless device suitable for use with various embodiments.

FIG. 5 is a component block diagram illustrating an example wireless device 500 suitable for use with various embodiments. With reference to FIGS. 1-5, the wireless device 500 may include an SOC 501 and/or a processor 502 coupled to an internal memory 504 and a touch surface input device/display 512, such as a resistive sensing touchscreen, capacitive sensing touchscreen, infrared sensing touchscreen, acoustic/piezoelectric sensing touchscreen, or the like. The wireless device 500 may have an antenna 510 for sending and receiving electromagnetic radiation that may be connected to a wireless data link and/or cellular telephone transceiver 508 coupled to the processor 502 and/or one or more processors in the SOC 501. The wireless device 500 also may include a sound and/or video encoding/decoding (CODEC) circuit 510.

The sound and/or video CODEC circuit 510 may encode audio information for transmission, e.g., to a wireless earpiece (e.g., 102, 104, 400), and may decode received sound data packets to generate analog signals that are provided to a speaker 514 to generate sound and/or may decode received video data packets to generate video signals that are provided to the display 512 to output images. The wireless device 500 may also include a battery 522 to provide power to the various components of the wireless device 500. The wireless device 500 may also include physical buttons 524 for receiving user inputs. The wireless device may include a housing 520 to support the various components.

Figure 6:
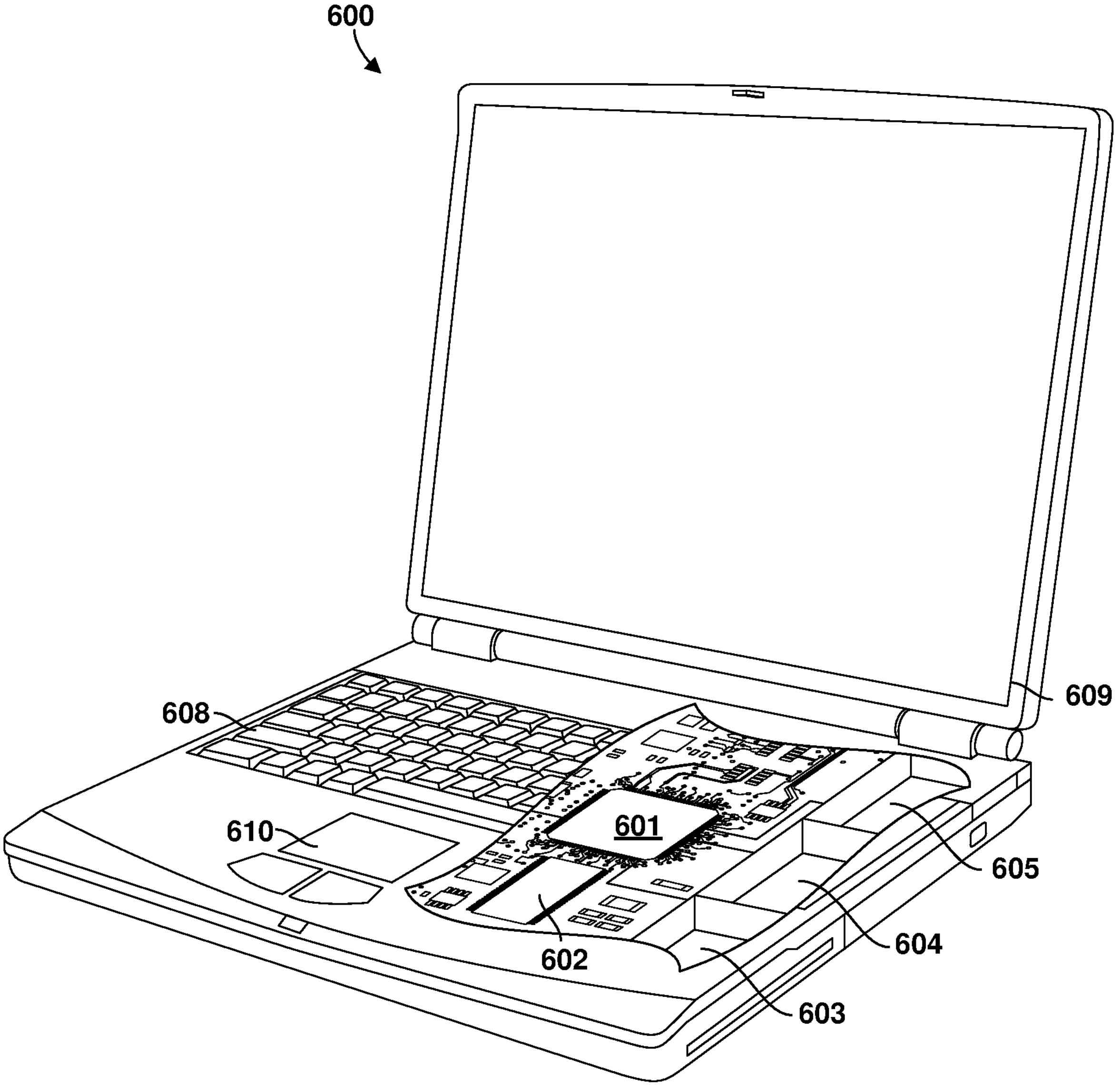
FIG. 6 is a component block diagram illustrating an example wireless device suitable for use with various embodiments.

FIG. 6 is a component block diagram illustrating an example wireless device 600 suitable for use with various embodiments. With reference to FIGS. 1-6, the wireless device 600 (which may include a variety of personal computers and laptop computers) may include a processor 602 coupled to volatile memory 601 and a large capacity nonvolatile memory, such as a disk drive 603. The wireless device 600 may also include a compact disc (CD) and/or DVD drive 604 coupled to the processor 602. The wireless device 600 may also include a number of connector ports coupled to the processor 602 for establishing data connections or receiving external memory devices, such as a network connection circuit for coupling the processor 602 to a network. The wireless device 600 may have a radio/antenna 605 for sending and receiving electromagnetic radiation that is connected to a wireless data link coupled to the processor 602. The processor 602 may further be coupled to a keyboard 608, a pointing device such as a trackpad 610, and a display device 609.

The processors 402, 502, 602 may be any programmable microprocessor, microcomputer or multiple processor chip or chips that may be configured by software instructions (applications) to perform a variety of functions, including the functions of the various embodiments described herein. Multiple processors may be provided, such as one processor dedicated to wireless communication functions and one processor dedicated to running other applications. Typically, software applications may be stored in the internal memory before they are accessed and loaded into the processor 402, 502, 602. In some devices, the processor 402, 502, 602 may include internal memory sufficient to store the application software instructions. In some mobile devices, the secure memory may be in a separate memory chip coupled to the processor 402, 502, 602. The internal memory may be a volatile or nonvolatile memory, such as flash memory, or a mixture of both. For the purposes of this description, a general reference to memory refers to all memory accessible by the processor, including internal memory, removable memory plugged into the device, and memory within the processor 402, 502, 602.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the method 200 and the operations 300*a*, 300*b*, and 300*c* may be substituted for or combined with one or more operations of the method 200 and the operations 300*a*, 300*b*, and 300*c*.

Implementation examples are described in the following paragraphs. While some of the following implementation examples are described in terms of example methods, further example implementations may include: the example methods discussed in the following paragraphs implemented by a base station including a processor configured with processor-executable instructions to perform operations of the methods of the following implementation examples; the example methods discussed in the following paragraphs implemented by a base station including means for performing functions of the methods of the following implementation examples; and the example methods discussed in the following paragraphs may be implemented as a non-transitory processor-readable storage medium having stored thereon processor-executable instructions configured to cause a processor of a base station to perform the operations of the methods of the following implementation examples.

Example 1. A method of managing a first earpiece and a second earpiece for presenting an audio stream from a wireless device, including: monitoring a battery level of the first earpiece and a battery level of the second earpiece; determining whether the battery level of the first earpiece meets a threshold; and configuring the wireless device to send a monophonic audio stream to the second earpiece in response to determining that the battery level of the first earpiece meets the threshold.

Example 2. The method of example 1, further including receiving the monophonic audio stream by the second earpiece.

Example 3. The method of any of examples 1-2, further including sending the monophonic audio stream from the wireless device to the second earpiece.

Example 4. The method of any of examples 1-3, further including presenting a notification that the wireless device will send or is sending the monophonic audio stream to the second earpiece.

Example 5. The method of any of examples 1-3, further including: presenting a notification that the wireless device will send the monophonic audio stream to the wireless device via a user interface configured to receive an acceptance input or an override input; and leaving the wireless device in a configuration to send audio streams to the first and second earpieces in response to receiving the override input on the user interface, in which configuring the wireless device to send a monophonic audio stream to the second earpiece is performed in response to determining that the battery level of the first earpiece meets the threshold and receiving the acceptance input on the user interface.

Example 6. The method of any of examples 1-3, further including: presenting a notification that the wireless device will send the monophonic audio stream to the wireless device via a user interface configured to receive an acceptance input or an override input, in which configuring the wireless device to send a monophonic audio stream to the second earpiece is performed in response to determining that the battery level of the first earpiece meets the threshold and a passage of a predetermined amount of time following displaying the notification without receiving a user input on the user interface.

Example 7. The method of any of examples 1-6, further including: determining whether a difference between the battery level of the first earpiece and the battery level of the second earpiece meets a threshold difference; and presenting a notification to move the wireless device closer to the first earpiece or the second earpiece having a lower battery level in response to determining that the difference between the battery level of the first earpiece and the battery level of the second earpiece meets the threshold difference.

Example 8. The method of any of examples 1-7, in which: determining whether the battery level of the first earpiece meets a threshold includes determining whether a difference between the battery level of the first earpiece and the battery level of the second earpiece meets a threshold difference; and configuring the wireless device to send a monophonic audio stream to the second earpiece in response to determining that the battery level of the first earpiece meets the threshold includes configuring the wireless device to send a monophonic audio stream to the second earpiece in response to determining that the difference between the battery level of the first earpiece and the battery level of the second earpiece meets the threshold difference.

Example 9. The method of any of examples 1-8, further including placing the first earpiece in a low power mode.

Example 10. The method of any of examples 1-9, in which configuring the wireless device to send a monophonic audio stream to the second earpiece includes mixing a first audio stream channel and a second audio stream channel to form the monophonic audio stream.

Example 11. The method of any of examples 1-9, in which configuring the wireless device to send a monophonic audio stream to the second earpiece includes mixing a first signal from a first signal source and a second signal from a second signal source to form the monophonic audio stream.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as “thereafter,” “then,” “next,” etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory computer-readable or processor-readable storage medium. The steps of a method or algorithm disclosed herein may be embodied in a processor-executable software module which may reside on a non-transitory processor-readable or computer-readable storage medium. Non-transitory processor-readable and computer-readable media may be any available storage media that may be accessed by a computer or a processor of a computing device. By way of example, and not limitation, such non-transitory processor-readable or computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer or processor of a computing device. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory processor-readable medium and/or non-transitory computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of managing a first earpiece and a second earpiece by a wireless device, comprising:

monitoring a battery level of the first earpiece and a battery level of the second earpiece, wherein a first audio stream channel is output by the first earpiece and a second audio stream channel is output by the second earpiece; and in response to the battery level of the first earpiece falling below a threshold:

mixing the first audio stream channel and the second audio stream channel into a monophonic audio stream; and configuring the wireless device to send the monophonic audio stream to the second earpiece.

2. The method of claim 1, further comprising sending the monophonic audio stream from the wireless device to the second earpiece.

3. The method of claim 1, further comprising presenting a notification that the wireless device will send or is sending the monophonic audio stream to the second earpiece.

4. The method of claim 1, further comprising:

presenting a notification that the wireless device will send the monophonic audio stream to the wireless device via a user interface configured to receive an acceptance input or an override input; and leaving the wireless device in a configuration to send audio streams to the first and second earpieces in response to receiving the override input on the user interface, wherein configuring the wireless device to send a monophonic audio stream to the second earpiece is performed in response to determining that the battery level of the first earpiece meets the threshold and receiving the acceptance input on the user interface.

5. The method of claim 1, further comprising:

presenting a notification that the wireless device will send the monophonic audio stream to the wireless device via a user interface configured to receive an acceptance input or an override input, wherein configuring the wireless device to send a monophonic audio stream to the second earpiece is performed in response to determining that the battery level of the first earpiece meets the threshold and a passage of a predetermined amount of time following displaying the notification without receiving a user input on the user interface.

6. The method of claim 1, further comprising:

determining whether a difference between the battery level of the first earpiece and the battery level of the second earpiece meets a threshold difference; and presenting a notification to move the wireless device closer to the first earpiece or the second earpiece having a lower battery level in response to determining that the difference between the battery level of the first earpiece and the battery level of the second earpiece meets the threshold difference.

7. The method of claim 1, further comprising:

determining whether a difference between the battery level of the first earpiece and the battery level of the second earpiece meets a difference threshold; and configuring the wireless device to send a monophonic audio stream to the second earpiece in response to determining that the difference between the battery level of the first earpiece and the battery level of the second earpiece meets the difference threshold.

8. The method of claim 1, further comprising placing the first earpiece in a low power mode in response to the battery level of the first earpiece falling below the threshold.

9. The method of claim 1, wherein the first audio stream channel is from a first signal source and the second audio stream channel is from a second signal source.

10. A wireless device, comprising:

a wireless transceiver configured to received data from and send audio streams to a first earpiece and a second earpiece; and a processor coupled to the wireless transceiver and configured to:

monitor a battery level of the first earpiece and a battery level of the second earpiece, wherein a first audio stream channel is output by the first earpiece and a second audio stream channel is output by the second earpiece;

and in response to the battery level of the first earpiece falling below a threshold:

mix the first audio stream channel and the second audio stream channel into a monophonic audio stream; and configure the wireless device to send a monophonic audio stream to the second earpiece.

11. The wireless device of claim 10, wherein the processor is further configured to send the monophonic audio stream from the wireless device to the second earpiece.

12. The wireless device of claim 10, wherein the processor is further configured to present a notification that the wireless device will send or is sending the monophonic audio stream to the second earpiece.

13. The wireless device of claim 10, wherein the processor is further configured to:

present a notification that the wireless device will send the monophonic audio stream to the wireless device via a user interface configured to receive an acceptance input or an override input;

leave the wireless device in a configuration to send audio streams to the first and second earpieces in response to receiving the override input on the user interface; and configure the wireless device to send a monophonic audio stream to the second earpiece in response to determining that the battery level of the first earpiece meets the threshold and receiving the acceptance input on the user interface.

14. The wireless device of claim 10, wherein the processor is further configured to:

present a notification that the wireless device will send the monophonic audio stream to the wireless device via a user interface configured to receive an acceptance input or an override input; and configure the wireless device to send a monophonic audio stream to the second earpiece is performed in response to determining that the battery level of the first earpiece meets the threshold and a passage of a predetermined amount of time following displaying the notification without receiving a user input on the user interface.

15. The wireless device of claim 10, further comprising:

determining whether a difference between the battery level of the first earpiece and the battery level of the second earpiece meets a threshold difference; and presenting a notification to move the wireless device closer to the first earpiece or the second earpiece having a lower battery level in response to determining that the difference between the battery level of the first earpiece and the battery level of the second earpiece meets the threshold difference.

16. The wireless device of claim 10, wherein the processor is further configured to:

determine whether a difference between the battery level of the first earpiece and the battery level of the second earpiece meets a difference threshold; and configure the wireless device to send a monophonic audio stream to the second earpiece in response to determining that the difference between the battery level of the first earpiece and the battery level of the second earpiece meets the difference threshold.

17. The wireless device of claim 10, wherein the processor is further configured to place the first earpiece in a low power mode in response to the battery level of the first earpiece falling below the threshold.

18. The wireless device of claim 10, wherein the first audio stream channel is from a first signal source and the second audio stream channel is from a second signal source.

19. A wireless device, comprising:

means for sending audio streams to a first earpiece and a second earpiece;

means for monitoring a battery level of the first earpiece and a battery level of the second earpiece, wherein a first audio stream channel is output by the first earpiece and a second audio stream channel is output by the second earpiece; and means for mixing the first audio stream channel and the second audio stream channel into a monophonic audio stream in response to the battery level of the first earpiece falling below a threshold;

means for configuring the wireless device to send a monophonic audio stream to the second earpiece in response to the battery level of the first earpiece falling below the threshold.

20. The wireless device of claim 19, further comprising means for sending the monophonic audio stream from the wireless device to the second earpiece.

21. The wireless device of claim 19, further comprising means for presenting a notification that the wireless device will send or is sending the monophonic audio stream to the second earpiece.

22. The wireless device of claim 19, further comprising:

means for presenting a notification that the wireless device will send the monophonic audio stream to the wireless device via a user interface configured to receive an acceptance input or an override input; and means for leaving the wireless device in a configuration to send audio streams to the first and second earpieces in response to receiving the override input on the user interface, wherein means for configuring the wireless device to send a monophonic audio stream to the second earpiece comprises means for configuring the wireless device to send a monophonic audio stream to the second earpiece in response to determining that the battery level of the first earpiece meets the threshold and receiving the acceptance input on the user interface.

23. The wireless device of claim 19, further comprising:

means for presenting a notification that the wireless device will send the monophonic audio stream to the wireless device via a user interface configured to receive an acceptance input or an override input, wherein means for configuring the wireless device to send a monophonic audio stream to the second earpiece comprises means for configuring the wireless device to send a monophonic audio stream to the second earpiece in response to determining that the battery level of the first earpiece meets the threshold and a passage of a predetermined amount of time following displaying the notification without receiving a user input on the user interface.

24. The wireless device of claim 19, further comprising:

means for determining whether a difference between the battery level of the first earpiece and the battery level of the second earpiece meets a threshold difference; and means for presenting a notification to move the wireless device closer to the first earpiece or the second earpiece having a lower battery level in response to determining that the difference between the battery level of the first earpiece and the battery level of the second earpiece meets the threshold difference.

25. The wireless device of claim 19, further comprising:

means for determining whether a difference between the battery level of the first earpiece and the battery level of the second earpiece meets a difference threshold; and means for configuring the wireless device to send a monophonic audio stream to the second earpiece in response to determining that the difference between the battery level of the first earpiece and the battery level of the second earpiece meets the difference threshold.

26. The wireless device of claim 19, further comprising means for placing the first earpiece in a low power mode in response to the battery level of the first earpiece falling below the threshold.

27. A first earpiece, comprising:

a wireless transceiver configured to communicate with a second earpiece and receive audio streams from a wireless device;

a speaker; and a processor coupled to the wireless transceiver and the speaker, and configured to:

monitor a battery level of the first earpiece and a battery level of the second earpiece, wherein a first audio stream channel is output by the first earpiece and a second audio stream channel is output by the second earpiece;

in response to the battery level of the first earpiece falling below a threshold:

communicate with the wireless device to cause the wireless device to send a monophonic audio stream to the second earpiece; and communicate with the wireless device to cause the wireless device to send a monophonic audio stream to the first earpiece.

28. The wireless device of claim 27, wherein the processor is further configured to present an audio notification that the wireless device will send the monophonic audio stream to one of the first earpiece or the second earpiece.

* * * * *